(12) United States Patent
Lee et al.

(10) Patent No.: US 6,628,955 B2
(45) Date of Patent: Sep. 30, 2003

(54) SYSTEM AND METHOD FOR INCREASING THE DATA RATE FOR CELLULAR DIGITAL PACKET DATA (CDPD) SERVICES

(75) Inventors: Leonard Lee, Cary, NC (US); Evin Feli, San Diego, CA (US)

(73) Assignee: Ericsson, Inc., Research Triangle Park, NC (US)

( * ) Notice: Subject to any disclaimer, the term of this patent is extended or adjusted under 35 U.S.C. 154(b) by 211 days.

(21) Appl. No.: 09/881,358

(22) Filed: Jun. 14, 2001

(65) Prior Publication Data

US 2003/0008673 A1 Jan. 9, 2003

(51) Int. Cl.[7] .................................................. H04Q 7/20
(52) U.S. Cl. ........................ 455/466; 455/423; 455/422; 455/516
(58) Field of Search ................................. 455/418, 423, 455/424, 425, 422, 420, 509, 516, 511, 520, 553, 466, 550; 370/474, 469, 473, 352, 354

(56) References Cited

U.S. PATENT DOCUMENTS

| | | | |
|---|---|---|---|
| 5,845,215 A | * 12/1998 | Henry et al. | 455/553 |
| 6,157,845 A | * 12/2000 | Henry et al. | 455/553 |
| 6,327,256 B1 | * 12/2001 | Paivike et al. | 370/337 |
| 6,389,066 B1 | * 5/2002 | Ejzak | 370/252 |

* cited by examiner

*Primary Examiner*—Nay Maung
*Assistant Examiner*—John J Lee
(74) *Attorney, Agent, or Firm*—Moore & Van Allen; Gregory A. Stephens

(57) ABSTRACT

A method and device(s) for increasing the Cellular Digital Packet Data (CDPD) user data rate between a mobile terminal and a basestation in a digital cellular mobile communications system. The method and device(s) use the same modulation scheme that is used for digital speech to encapsulate CDPD block data, specifically, the TIA/EIA-136 standard. The TIA/EIA-136 standard can accommodate more data than the GMSK modulation scheme that is typically used for CDPD block data. In order to encapsulate CDPD block data using the TIA/EIA-136 standard, an encoding step is performed on the sending end that includes constructing a CDPD block comprised of CDPD data, assembling an TIA/EIA-136 frame leaving the data fields of the frame empty, and placing CDPD block data in the data fields. The assembled TIA/EIA-136 frame is then sent using existing transmission code. To unpack the CDPD block data, a decoding step is performed on the receiving end that includes receiving the TIA/EIA-136 frame comprised of CDPD data in the data fields of the TIA/EIA-136 frame, and re-constructing the CDPD block from the data fields. Once re-constructed, the CDPD block is forwarded to existing CDPD upper layer code for further processing.

11 Claims, 3 Drawing Sheets

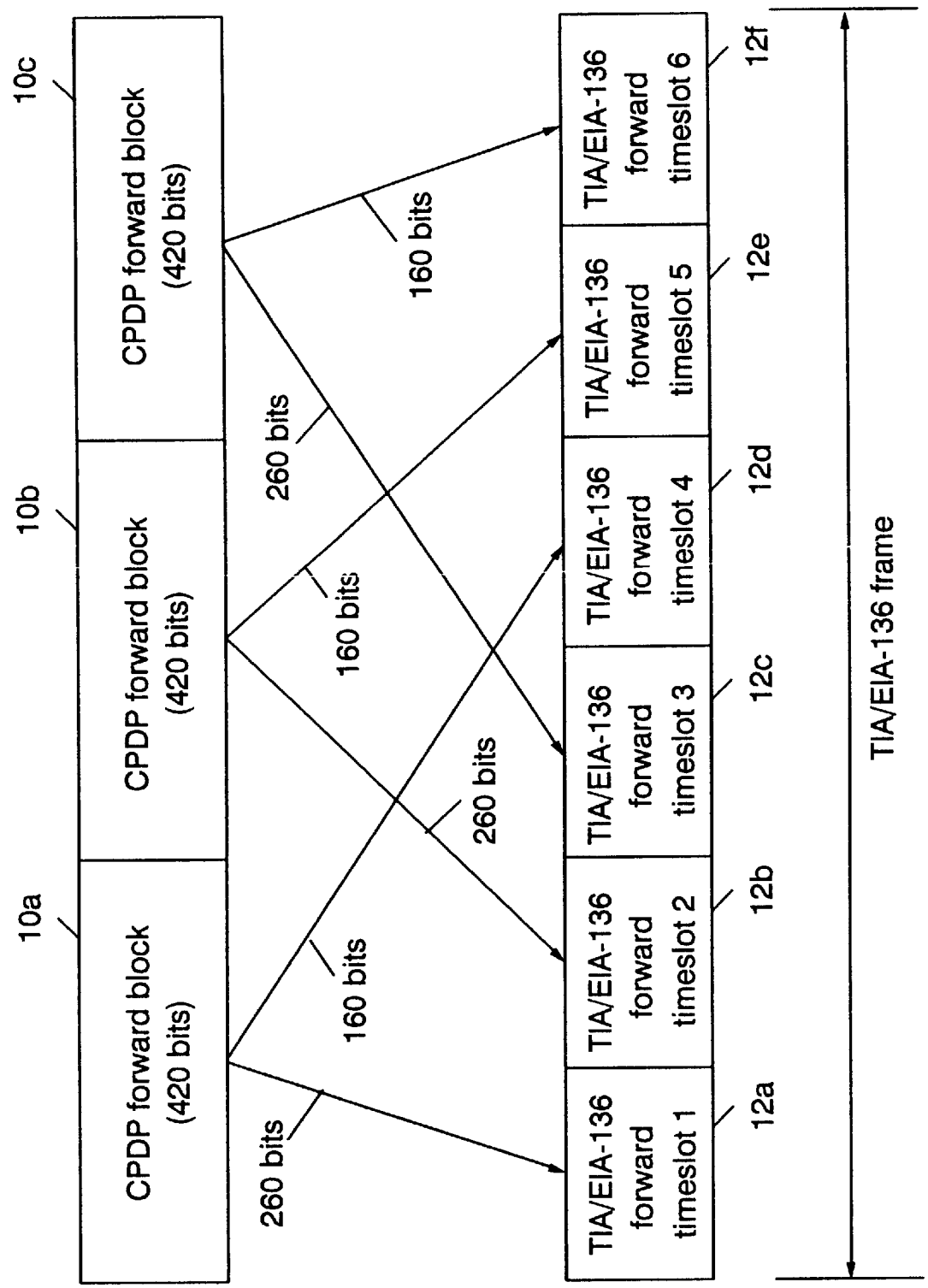

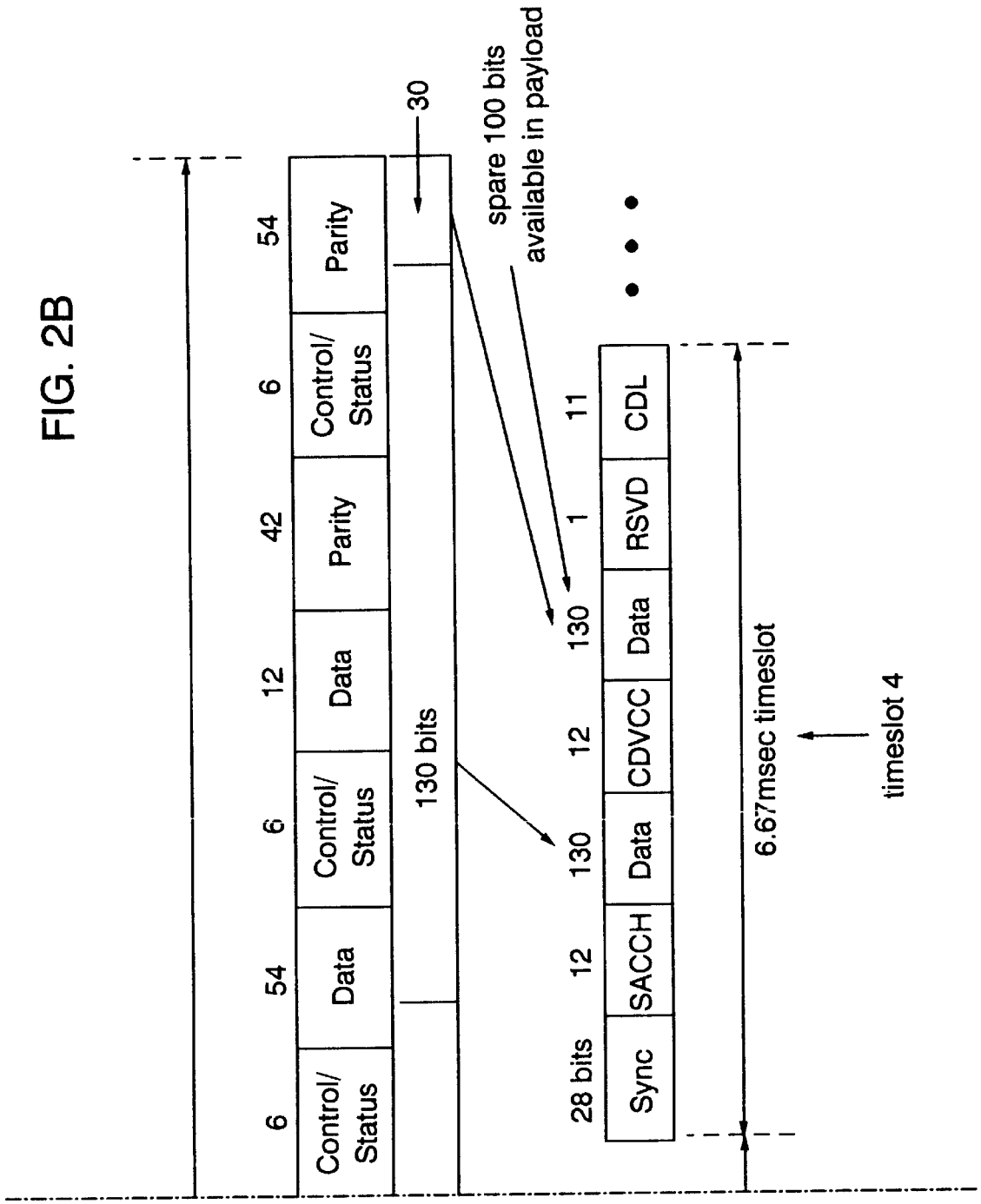

SYSTEM AND METHOD FOR INCREASING THE DATA RATE FOR CELLULAR DIGITAL PACKET DATA (CDPD) SERVICES

BACKGROUND OF THE INVENTION

The present invention relates to a method and device(s) for attaining increased data rates for Cellular Digital Packet Data (CDPD) services over a cellular telephony network. Increasing demand is anticipated for higher bandwidth packet data services to support the mobile Internet. Although Cellular Digital Packet Data (CDPD) is an established and growing packet data standard that provides extensive coverage in the United States and Latin America, the user data rate is limited to approximately 10 kbps.

SUMMARY OF THE INVENTION

The present invention increases the data rate approximately two-fold for CDPD by using an alternate modulation technique. Existing CDPD systems use Gaussian Minimum Shift Keying (GMSK) modulation to provide approximately 10 kbps of user data in a cellular environment. GMSK was originally selected as the modulation technique because, at the time, use of low cost non-linear power amplifiers in the mobile terminal was important. The low cost of non-linear power amplifiers is generally no longer a factor in mobile terminal manufacturing.

The present invention increases the CDPD data rate between a mobile terminal and a basestation in a digital cellular mobile communications system. The present invention uses a different modulation technique for encoding and decoding TIA/EIA-136 frames with respect to CDPD. Rather than using GMSK, the present invention uses the same modulation technique as the digital speech air interface. Specifically, the encoding step is comprised of constructing a CDPD block, assembling an TIA/EIA-136 frame leaving the data fields of the frame empty, and populating the data fields with CDPD block data. The assembled TIA/EIA-136 frame is then transmitted using existing transmission software within the mobile terminal or basestation. The decoding step is comprised of receiving the TIA/EIA-136 frame which has CDPD data in the data fields and re-assembling the CDPD block by extracting the CDPD block data from the TIA/EIA-136 frame's data fields. Once re-assembled, the CDPD block is forwarded to existing CDPD upper layer software within the mobile terminal or basestation for further processing.

The present invention pertains to communications between mobile terminals and basestations in a digital cellular communications system. Thus, when CDPD blocks are encoded in a mobile terminal they are sent to and decoded in the basestation. Similarly, when CDPD blocks are encoded in a basestation they are sent to and decoded in the mobile terminal.

BRIEF DESCRIPTION OF THE DRAWINGS

FIG. 1 illustrates downlink repacking of a plurality of CDPD forward blocks from a timeslot perspective for a single TIA/EIA-136 frame.

DETAILED DESCRIPTION OF THE INVENTION

Figure 2A:
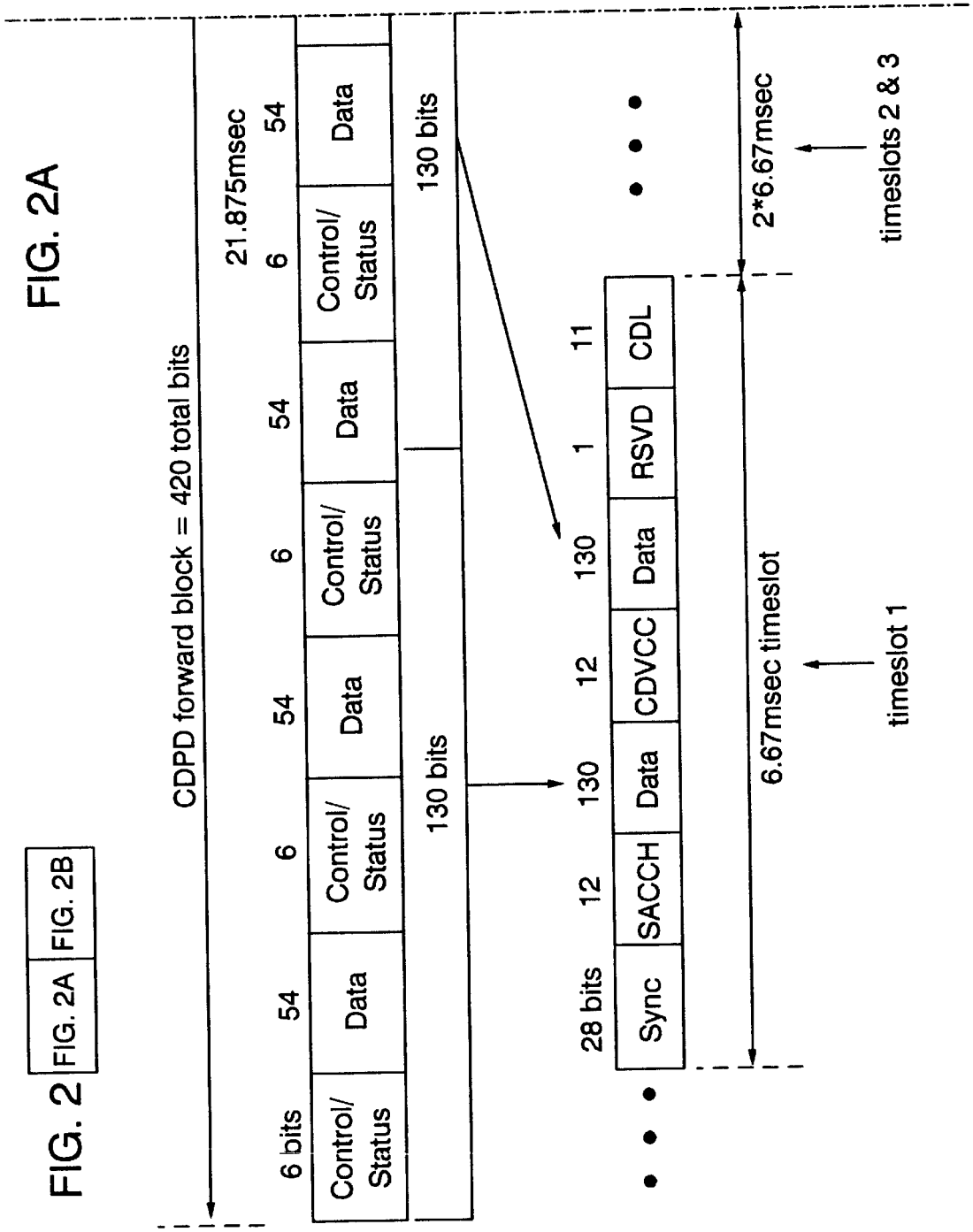
FIG. 2 illustrates downlink repacking of a single CDPD forward block from a bit level perspective for a portion of an TIA/EIA-136 frame.

CDPD is designed as an overlay system to the TIA/EIA-136 cellular voice network also known as the Time Division Multiple Access standard or simply TDMA. CDPD v1.1 standard uses GMSK as the modulation technique with a modulation index of h=0.5 and a raw data bit rate of 19.2 kbps.

The present invention uses a modulation and data bit rate that is identical to the modulation and data bit rate used for the TIA/EIA-136 air interface for digital speech. By using the same modulation specification for CDPD as is used for digital speech, currently implemented algorithms in the basestation and mobile terminal for demodulation, channel equalization, synchronization, etc. can be reused.

The TIA/EIA-136 air interface has a raw bit rate of 48.6 kbps which is more than two and a half times the raw bit rate of GMSK (19.2 kbps. Due to overhead, the present invention does not achieve a linear 2.5 times data rate improvement over GMSK. However, 1.5 to 2 times the data rate of GMSK is achievable.

The present invention encapsulates a single CDPD data block (including channel coding, control bits, etc.) in the data fields normally occupied by digital speech and unused control bits in two TIA/EIA-136 timeslots. Each TIA/EIA-136 frame is comprised of six timeslots. Thus, multiple CDPD data blocks can be encapsulated within a single TIA/EIA-136 frame. By doing this, mobile terminals and basestations can use software already resident in the mobile terminals and basestations to decode the CDPD block data since the modulation scheme is the same as for digital speech.

The present invention increases the CDPD data rate between a mobile terminal and a basestation in a digital cellular mobile communications system by using TIA/EIA-136 air interface modulation rather than GMSK. To do this, a CDPD block is encoded into an TIA/EIA-136 frame on the sending end and decoded from the TIA/EIA-136 frame on the receiving end.

Encoding a CDPD block into an TIA/EIA-136 frame starts with constructing a CDPD block and assembling an TIA/EIA-136 frame leaving the data fields of the TIA/EIA-136 frame empty. Next, the CDPD block is partitioned into CDPD block data bit lengths that can be accommodated by the data fields of the TIA/EIA-136 frame. CDPD block data is then placed into the data fields of the TIA/EIA-136 frame and the assembled TIA/EIA-136 frame having CDPD block data in the data fields is sent to existing transmission software.

Decoding the TIA/EIA-136 frame containing CDPD block data begins with receiving the TIA/EIA-136 frame comprised of CDPD data in the data fields using existing receiving software. The CDPD block is then re-constructed after extracting the CDPD block data from the data fields of the TIA/EIA-136 frame. Once the CDPD block is reconstructed, it is forwarded to existing CDPD upper layer software for further processing.

FIG. 1 illustrates downlink repacking of a plurality of CDPD forward blocks from a timeslot perspective for a single TIA/EIA-136 frame. Each CDPD block 10a–10c contains 420 bits of data. Three CDPD blocks contain 3*420=1260 bits of data. Each TIA/EIA-136 frame is comprised of six timeslots 12a–12f. As will be explained later, each timeslot 12a–12f has a data capacity of 260 bits meaning each TIA/EIA-136 frame has a data capacity of 6*260=1560 bits. Thus, three CDPD blocks 10a–10c can be encapsulated by all six timeslots 12a–12f of a single TIA/EIA-136 frame. Under the TIA/EIA-136 standard, the six timeslots are paired together as follows: timeslots 1 and 4, timeslots 2 and 5, and timeslots 3 and 6. Therefore, when the first CDPD block 10a fills the first timeslot 12a with 260 bits of data, the remaining 160 bits of CDPD block 10a are populated in the fourth timeslot 12d. Similarly, when the second CDPD block 10b fills the second timeslot 12b with 260 bits of data, the remaining 160 bits of CDPD block 10b are populated in the fifth timeslot 12e. And lastly, when the third CDPD block 10c fills the third timeslot 12c with 260 bits of data, the remaining 160 bits of CDPD block 10c are populated in the sixth timeslot 12f.

FIG. 2 illustrates downlink repacking of a single CDPD forward block from a bit level perspective for a portion (2 timeslots) of an TIA/EIA-136 frame.

The number of bits in each field for CDPD forward and reverse blocks is shown in Table 1. The forward block corresponds to downlink communications while the reverse block corresponds to uplink communications between mobile terminals and basestations.

TABLE 1

|  | Color Code | Control | Data, Busy/Idle, Sync | Parity | Continuity | Total |
|---|---|---|---|---|---|---|
| Forward | — | 42 | 282 | 96 | — | 420 |
| Reverse | 8 | — | 282 | 96 | 7 | 393 |

Each CDPD forward block takes 21.875 ms to transmit while each reverse block (not shown) takes 20.0592 ms to transmit.

The number of bits in each field of the EIA-TIA 136 digital traffic timeslots is shown in Table 2.

TABLE 2

|  | SYNC | SACCH | DATA | CDVCC | RSVD | CDL | Guard/Ramp | Total |
|---|---|---|---|---|---|---|---|---|
| Forward | 28 | 12 | 260 | 12 | 1 | 11 | — | 324 |
| Reverse | 28 | 12 | 260 | 12 | — | — | 12 | 324 |

There are six timeslots for each forward and reverse TIA/EIA-136 frame. Thus, the total number of data bits available to encapsulate the CDPD blocks is 6*260=1560 bits per TIA/EIA-136 frame (40 ms). CDPD data is encapsulated in the DATA field which normally holds digital speech. A single CDPD forward block is broken down into three sections of 130 bits with a remaining section of 30 bits. The 130 bit sections are then placed into the "data" fields of the CDPD block's corresponding timeslots. In this case CDPD block 1 corresponds with timeslots 1 and 4 of the TIA/EIA-136 frame. 130 bit sections were chosen to correspond with the bit capacity of the data fields in each timeslot. Since each timeslot has two data fields, a maximum of 260 bits per timeslot can be encapsulated. Moreover, each CDPD block spans two timeslots yielding a maximum bit capacity of 2*260=520 bits. On the forward channel, a CDPD forward block is comprised of 420 bits leaving room for 100 additional bits in the timeslots of the TIA/EIA-136 frame. Since each TIA/EIA-136 frame can accommodate three CDPD blocks, a total of 300 additional bits in the TIA/EIA-136 frame can be accommodated. These remaining 300 bits can be ignored or used as additional synchronization bits or for additional error correction.

Similarly, on the CDPD reverse channel, the present invention can encapsulate three reverse CDPD blocks into a single TIA/EIA-136 frame.

The present invention leaves the sync bits in each TIA/EIA-136 timeslot intact. As a result, pre-existing algorithms can be used to synchronize and demodulate the data. This means that the CDPD data rate is increased by 50% to approximately 15 kbps.

In addition, with some software changes, it is possible to transmit four CDPD frames per TIA/EIA-136 frame which would achieve a doubling of the CDPD data rate to 20 kbps. The software changes involve allowing both the SACCH and CDVCC fields that are not used by CDPD to contain CDPD data. This would result in 1704 bits per TIA/EIA-136 frame. Thus, four CDPD forward channel blocks (420*4= 1680 bits) can be encapsulated in a single voice frame leaving 24 bits to spare. The equalizer code would need to be modified since CDVCC is typically used as a training sequence. In this case, the CDPD synchronization word can be used as the training sequence for the equalizer code instead.

A beneficial side effect of the present invention is that existing basestation hardware and mobile terminal hardware utilizing the TIA/EIA-136 standard will not need to be modified in order to incorporate the present invention. Basestation software and mobile terminal software will only require modest changes as they already possess the algorithms necessary to implement the concepts of the present invention.

The present invention is described herein in the context of a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

In addition, the present invention may be described herein in the context of a GSM cellular communication system. While the present invention may be particularly useful for improving the performance of GSM cellular networks, it should be understood that the principles of the present invention may be applied to any cellular or wireless system utilizing other air interfaces, such as TDMA, CDMA, or FDMA. It should be further understood that the principles of the present invention may be utilized in hybrid systems that are combinations of two or more of the above air interfaces. In addition, a mobile terminal, in accordance with the present invention, may be designed to communicate with a base station transceiver using any standard based on GSM, TDMA, CDMA, FDMA, a hybrid of such standards or any other standard.

The present invention may be embodied as cellular communication systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method of increasing the CDPD data rate between a mobile terminal and a basestation in a digital cellular mobile communications system, comprising:
   an encoding step comprised of:
      constructing a CDPD block;
      assembling an TIA/EIA-136 frame leaving the data fields of the TIA/EIA-136 frame empty;
      partitioning the CDPD block into CDPD block data bit lengths that can be accommodated by the data fields of the TIA/EIA-136 frame;
      placing partitioned CDPD block data in the data fields of the TIA/EIA-136 frame;
      sending the assembled TIA/EIA-136 frame having CDPD block data in the data fields to existing transmission software; and
   a decoding step comprised of:
      receiving the TIA/EIA-136 frame comprised of CDPD data in the data fields of the TIA/EIA-136 frame using existing receiving software;
      re-constructing the CDPD block from the data fields of the TIA/EIA-136 frame; and
      forwarding the re-constructed CDPD block to existing CDPD upper layer software for further processing.

2. The method of claim 1 wherein said encoding step is performed in the mobile terminal and the decoding step is performed in the basestation.

3. The method of claim 1 wherein said encoding step is performed in the base station and the decoding step is performed in the mobile terminal.

4. In a mobile terminal, a method of increasing the CDPD data rate in a digital cellular communications system, comprising:
   constructing a CDPD block;
   assembling an TIA/EIA-136 frame leaving the data fields of the TIA/EIA-136 frame empty;
   partitioning the CDPD block into CDPD block data bit lengths that can be accommodated by the data fields of the TIA/EIA-136 frame; and
   placing partitioned CDPD block data in the data fields of the TIA/EIA-136 frame.

5. In a basestation, a method of increasing the CDPD data rate in a digital cellular communications system, comprising:
   constructing a CDPD block;
   assembling an TIA/EIA-136 frame leaving the data fields of the TIA/EIA-136 frame empty;
   partitioning the CDPD block into CDPD block data bit lengths that can be accommodated by the data fields of the TIA/EIA-136 frame; and
   placing partitioned CDPD block data in the data fields of the TIA/EIA-136 frame.

6. In a mobile terminal, a computer program product that increases the CDPD data rate, the computer program product having a medium with a computer program embodied thereon, the computer program product comprising:
   computer program code for constructing a CDPD block;
   computer program code for assembling an TIA/EIA-136 frame leaving the data fields of the TIA/EIA-136 frame empty;
   computer program code for partitioning the CDPD block into CDPD block data bit lengths that can be accommodated by the data fields of the TIA/EIA-136 frame; and
   computer program code for placing partitioned CDPD block data in the data fields of the TIA/EIA-136 frame.

7. In a basestation, a computer program product that increases the CDPD data rate, the computer program product having a medium with a computer program embodied thereon, the computer program product comprising:
   computer program code for constructing a CDPD block;
   computer program code for assembling an TIA/EIA-136 frame leaving the data fields of the TIA/EIA-136 frame empty;
   computer program code for partitioning the CDPD block into CDPD block data bit lengths that can be accommodated by the data fields of the TIA/EIA-136 frame; and
   computer program code for placing partitioned CDPD block data in the data fields of the TIA/EIA-136 frame.

8. A system of increasing the CDPD data rate between a mobile terminal and a basestation in a digital cellular mobile communications system, comprising:
   a mobile terminal that constructs a CDPD block; assembles an TIA/EIA-136 frame leaving the data fields of the TIA/EIA-136 frame empty; partitions the CDPD block into CDPD block data bit lengths that can be accommodated by the data fields of the TIA/EIA-136 frame; and places the partitioned CDPD block data into the data fields of the TIA/EIA-136 frame; and
   a basestation that receives the TIA/EIA-136 frame comprised of CDPD data in the data fields of the TIA/EIA-136 frame; and re-constructs the CDPD block from the data fields of the TIA/EIA-136 frame.

9. A system of increasing the CDPD data rate between a mobile terminal and a basestation in a digital cellular mobile communications system, comprising:

a basestation that constructs a CDPD block; assembles an TIA/EIA-136 frame leaving the data fields of the TIA/EIA-136 frame empty; partitions the CDPD block into CDPD block data bit lengths that can be accommodated by the data fields of the TIA/EIA-136 frame; and places the partitioned CDPD block data into the data fields of the TIA/EIA-136 frame; and a mobile terminal that receives the TIA/EIA-136 frame comprised of CDPD data in the data fields of the TIA/EIA-136 frame; and re-constructs the CDPD block from the data fields of the TIA/EIA-136 frame.

10. A mobile terminal for increasing the CDPD data rate in a digital cellular mobile communications system, comprising means for constructing a CDPD block; means for assembling an TIA/EIA-136 frame leaving the data fields of the TIA/EIA-136 frame empty; means for partitioning the CDPD block into CDPD block data bit lengths that can be accommodated by the data fields of the TIA/EIA-136 frame; and means for placing partitioned CDPD block data in the data fields of the TIA/EIA-136 frame.

11. A basestation for increasing the CDPD data rate in a digital cellular mobile communications system, comprising means for constructing a CDPD block; means for assembling an TIA/EIA-136 frame leaving the data fields of the TIA/EIA-136 frame empty; means for partitioning the CDPD block into CDPD block data bit lengths that can be accommodated by the data fields of the TIA/EIA-136 frame; and means for placing partitioned CDPD block data in the data fields of the TIA/EIA-136 frame.

* * * * *